(12) United States Patent
Na

(10) Patent No.: US 12,086,538 B2
(45) Date of Patent: Sep. 10, 2024

(54) METHOD FOR GENERATING ONLINE REPORT USING FORM STRUCTURE DEFINITION DB, AND COMPUTER PROGRAM FOR SAME

(71) Applicant: Geunil Na, Pyeongchang-gun (KR)

(72) Inventor: Geunil Na, Pyeongchang-gun (KR)

( * ) Notice: Subject to any disclaimer, the term of this patent is extended or adjusted under 35 U.S.C. 154(b) by 0 days.

(21) Appl. No.: 17/924,429

(22) PCT Filed: May 12, 2021

(86) PCT No.: PCT/KR2021/005970
§ 371 (c)(1),
(2) Date: Nov. 10, 2022

(87) PCT Pub. No.: WO2021/230662
PCT Pub. Date: Nov. 18, 2021

(65) Prior Publication Data
US 2023/0186018 A1    Jun. 15, 2023

(30) Foreign Application Priority Data
May 12, 2020    (KR) .......................... 1020200056727

(51) Int. Cl.
*G06F 17/00*    (2019.01)
*G06F 16/93*    (2019.01)
*G06F 40/174*    (2020.01)

(52) U.S. Cl.
CPC ............ *G06F 40/174* (2020.01); *G06F 16/93* (2019.01)

(58) Field of Classification Search
None
See application file for complete search history.

(56) References Cited

U.S. PATENT DOCUMENTS

| 7,287,218 B1* | 10/2007 | Knotz ................ G06Q 10/10 715/209 |
| 2021/0240923 A1* | 8/2021 | Martinov ............ G06F 3/0482 |
| 2022/0138413 A1* | 5/2022 | Zou .................... G06F 16/248 715/234 |

FOREIGN PATENT DOCUMENTS

| JP | H0736893 | 2/1995 |
| JP | 2015167005 | 9/2015 |
| KR | 20010099047 | 11/2001 |

(Continued)

OTHER PUBLICATIONS

KIPO, International Search Report of PCT/KR2021/005970, Aug. 2, 2021 total 3 pages.

(Continued)

*Primary Examiner* — Mustafa A Amin
(74) *Attorney, Agent, or Firm* — LEX IP MEISTER, PLLC

(57) ABSTRACT

A method for generating an online report using a form structure definition DB, and a computer program for the same are proposed. The method for generating the online report using the form structure definition DB, and the computer program for the same are configured to register input form setting information of a report into a form structure definition DB through an administrator client, store input information for each item input through an input form from a user client into a report result DB, and for the report requested to be output, generate and output the report in a form that the input information for each item stored in the report result DB is combined with a preset output form.

10 Claims, 11 Drawing Sheets

(56) References Cited

FOREIGN PATENT DOCUMENTS

KR    100902193    6/2009
KR    20130009985  1/2013

OTHER PUBLICATIONS

KIPO, Notice of Preliminary Rejection of Application No. 10-2020-0056727, dated Jul. 16, 2020 total 7 pages,.
KIPO, Final Rejection of Application No. 10-2020-0056727, dated Nov. 24, 2020 total 5 pages.

* cited by examiner

FIG. 5

| Item code | Item code name | Item code name in Korean | Web group information |
|---|---|---|---|
| A | TEXT BOX | Text | TEXT-GROUP |
| B | SELECT BOX | Selection box | SELECT-GROUP |
| C | CHECK BOX | Checkbox | CHECK-GROUP |
| CD | CHECK + IMAGE | Choosing image | CHECK-IMAGE-GROUP |
| D | IMAGE + TEXT | Image | IMAGE-GROUP |
| E | SIGN | Signature | SIGN-GROUP |
| F | DATE TIME | Date &time | DATE-GROUP |
| G | SUB TITLE | Title | SUBTITLE-GROUP |
| H | MAP | Map | MAP-GROUP |
| I | RADIO BUTTON | Radio box | RADIO-GROUP |
| ID | RADIO + IMAGE | Selecting one image | RADIO-IMAGE-GROUP |
| J | NUMBER | Number | NUMBER-GROUP |
| K | TEL | Contact information | TEL-GROUP |
| M | Search BAR/QR/NFC | Tag | TAG-GROUP |
| N | Search JSP call | | CALLBACK-GROUP |
| O | DATE | Date | DATE-GROUP |
| P | Weather | Weather | WEATHER-GROUP |
| Q | JSP simple call | | CALLBACK-GROUP |
| R | TEXTAREA | Content | TEXTAREA-GROUP |
| S | Document number | | |
| T | Simple BAR/QR/NFC | Tag | TAG-GROUP |
| U | GRID | List | LIST-GROUP |
| W | WEB EDITOR | Web editor | WEBEDIT-GROUP |
| Z | JSP_Call | | CALLBACK-GROUP |

FIG. 6

[Input form fundamental information]

| Input form code | Created date | Modified date | Link output form code | Input form name (report form name) |
|---|---|---|---|---|
| 183 | 2020-04-01 15:40 | 2020-04-20 17:33 | TMP_00000183 | Facility maintenance report |

[Item setting information]

| Input form code | Item-specific serial number | Item code | Item name | Output order | Length | Minimum value | Maximum value |
|---|---|---|---|---|---|---|---|
| 183 | 1 | M | Maintenance facility | 1 |  | 0 | 0 |
| 183 | 2 | O | Maintenance date | 2 | 10 | 0 | 0 |
| 183 | 3 | A | Maintenance details | 3 | 200 | 0 | 0 |
| 183 | 4 | J | Maintenance amount | 4 | 10 | 0 | 20000000 |
| 183 | 5 | A | Other detail | 6 | 200 | 0 | 0 |
| 183 | 6 | D | Scene photos | 7 |  | 0 | 0 |
| 183 | 7 | H | Position information | 8 |  | 0 | 0 |
| 183 | 8 | E | Inspector's signature | 9 |  | 0 | 0 |
| 183 | 9 | I | Division of internal maintenance/outsourcing maintenance | 5 |  | 0 | 0 |

[Item setting information – item 9]

| Input form code | Item-specific serial number | Seq | Item name | Item value | Default value |
|---|---|---|---|---|---|
| 183 | 9 | 1 | Internal maintenance | OPT_1 | Y |
| 183 | 9 | 2 | Outsourcing maintenance | OPT_2 | N |

FIG. 7a

[Report result fundamental information]

| Result code | Created date | Creator | Input form code | Input form name (report form name) | Latitude | Longitude | Report name |
|---|---|---|---|---|---|---|---|
| 473 | 2020-04-21 19:32 | Su-Nam Seo | 183 | Facility maintenance report | 37.50 | 127.02 | Facility maintenance report |

[Relation between item-specific input information and item setting information]

| Result code | Item name | Item-specific serial number | Item code | Input form code |
|---|---|---|---|---|
| 473 | Maintenance facilities | 1 | M | 183 |
| 473 | Maintenance date | 2 | O | 183 |
| 473 | Maintenance details | 3 | A | 183 |
| 473 | Maintenance amount | 4 | J | 183 |
| 473 | Division of internal maintenance/outsourcing maintenance | 9 | I | 183 |
| 473 | Other detail | 5 | A | 183 |
| 473 | Scene photos | 6 | D | 183 |
| 473 | Position information | 7 | H | 183 |
| 473 | Inspector's signature | 8 | E | 183 |

FIG. 7b

[Result information (input information for each item)]

| Result code | Output order (output form) | Image file number | Maintenance facility code | Result data | Input form code | Other information |
|---|---|---|---|---|---|---|
| 473 | 1 | 0 | C101801010000101 | OO Community sports center, golf course, air conditioning | 183 | BARCODE-TYPE |
| 473 | 2 | 0 | | 20200421 | 183 | |
| 473 | 3 | 0 | | Maintenance test | 183 | |
| 473 | 4 | 0 | | 1500000 | 183 | |
| 473 | 9 | 0 | OPT_1 | Interior | 183 | |
| 473 | 5 | 0 | | Others | 183 | |
| 473 | 6 | 772 | | Photo 1 | 183 | IMAGE-TYPE |
| 473 | 6 | 773 | | Photo 2 | 183 | IMAGE-TYPE |
| 473 | 6 | 774 | | Photo 3 | 183 | IMAGE-TYPE |
| 473 | 7 | 775 | | 800-49 Yeoksam-dong, Gangnam-gu, Seoul | 183 | IMAGE-TYPE |
| 473 | 8 | 776 | | Su-Nam Seo | 183 | IMAGE-TYPE |

FIG. 9

METHOD FOR GENERATING ONLINE REPORT USING FORM STRUCTURE DEFINITION DB, AND COMPUTER PROGRAM FOR SAME

TECHNICAL FIELD

The present disclosure relates to a method for generating n online report using a form structure definition DB, and a computer program for the same and, more particularly, to a method for generating an online report using a form structure definition DB, and a computer program for the same, which are configured to register input form setting information of a report into a form structure definition DB through an administrator client, store input information for each item input through an input form from a user client into a report result DB, and for the report requested to be output, generate and output the report in a form that the input information for each item stored in the report result DB is combined with a preset output form.

BACKGROUND ART

Various techniques for generating and outputting reports on the basis of online input data have been proposed.

As an example of the related art, Korean Patent No. 10-0902193 (registered on Jun. 3, 2009) relates to a method for providing a customized report for search results, and proposes a configuration in which the search results of a database are provided as a customized report in a form specified by a client, and the provided report form is also output as it is by using a general program, so as to enable a user to edit the report, thereby improving search result utilization and promoting searcher's work convenience.

As another example of the related art, Korean Patent No. 10-1764774 (registered on Jul. 28, 2017) relates to a system of writing a report provided with a photo, and proposes a configuration to provide a function of selecting a report type and input fundamental information by using a program of writing the report provided with the photo, and then selecting a photo grid view, a list view, an enlarged view, input of a caption and description of the photo, input of an opinion, and a measurement type, so as to edit a measurement photo of a specific part of an original photo according to a baseline input, thereby generating a report in which photos, opinions, and related information for each project unit are input.

However, in the related art as described above, since a data input window or input menu for writing the report in a specific form is individually coded and developed for each report input form, or a report output material outputting input data in a report form is coded and developed for each report output form, there is inconvenience that individual code development work is required when a new report form is desired to be generated and used.

DISCLOSURE

Technical Problem

The present disclosure has been devised in consideration of the above problems, and an objective of the present disclosure is to provide a method for generating an online report using a form structure definition DB, and a computer program for the same, which are configured to register an input form setting information of a report in a form structure definition DB through an administrator client, store input information for each item input through an input form from a user client in a report result DB, and for the report requested to be output, generate and output the report in a form that the input information for each item stored in the report result DB is combined with a preset output form.

Technical Solution

According to one aspect of the present disclosure in consideration of the above objective, there is disclosed a method for generating an online report using a form structure definition DB, the method being executed on a report generation server configured to interwork with a user client and an administrator client through a network and including: 1) receiving, in an administrator mode, an input of a report form name and item setting information, which are for generating a new report form, from the administrator client, and registering input form setting information of a report including the report form name and the item setting information in the form structure definition DB, wherein the item setting information is input on the basis of an item code previously registered in an item code type DB; 2) receiving, in a user mode, an input of the selected report form name of the report, desired to be newly written, from the user client on the basis of the form structure definition DB, and providing an input form to the user client on the basis of the input form setting information registered for the selected and input report form name; 3) storing, in the user mode, input information for each item input through the input form from the user client in a report result DB together with the corresponding report form name, wherein the input information for each item is input on the basis of the item setting information; and 4) generating and outputting, in the user mode for the report requested for output by the user client, the report in a form in which the report form name and the input information for each item, which are stored in the report result DB, are combined with a preset output form.

Preferably, the inputting of the item setting information may be performed in a way of receiving one or more selected item codes to constitute the input form setting information among a plurality of item codes previously registered in the item code type DB, receiving respective item names for the selected item codes, and defining data format conditions capable of being input to the input form on the basis of data formats fundamentally set in the item code type DB for the selected item codes.

Preferably, the output form may be set by a report output form file defining an output form structure of the report on the basis of the input form setting information.

Preferably, in step 1), the input form setting information of the report may be classified to belong to any one of report form groups among a plurality of report form groups, so as to be registered in the form structure definition DB.

According to another aspect of the present disclosure, there is disclosed a computer program stored in a computer readable medium, the computer program being stored in the medium so as to execute a method for generating an online report in combination with hardware including a memory for storing one or more instructions and a processor for executing one or more instructions stored in the memory, and the method including: 1) receiving, in an administrator mode, an input of a report form name and item setting information, which are for generating a new report form, from the administrator client, and registering input form setting information of a report including the report form name and item setting information in a form structure definition DB, wherein the item setting information is input on the basis of an item code previously registered in an item code type DB;

2) receiving, in a user mode, an input of the selected report form name of the report, desired to be newly written, from the user client on the basis of the form structure definition DB, and providing an input form to the user client on the basis of the input form setting information registered for the selected and input report form name; 3) storing, in the user mode, input information for each item input through the input form from the user client in a report result DB together with the corresponding report form name, wherein the input information for each item is input on the basis of the item setting information; and 4) generating and outputting, in the user mode for the report requested for output by the user client, the report in a form in which the report form name and the input information for each item, which are stored in the report result DB, are combined with a preset output form.

Advantageous Effects

As described above, the present disclosure is configured to register the input form setting information of the report in the form structure definition DB through the administrator client, and store the input information for each item that is input through the input form from the user client, whereby there is an advantage that the input form of the report may be conveniently set and used according to various report forms.

In addition, according to the present disclosure, the data input window or input menu for writing the report of various forms is not required to be individually coded and developed for each input report form, and the report output material outputting the input data in the report form is not required to be coded and developed for each output report form, whereby there is an advantage that user convenience and work efficiency are increased in the generation, use, and output of new report forms.

DESCRIPTION OF DRAWINGS

FIG. 5 is an exemplary view illustrating a configuration of an item code type DB.

FIG. 6 is an exemplary view illustrating a configuration of a form structure definition DB.

FIGS. 7a and 7b are exemplary views respectively illustrating a configuration of a report result DB.

FIG. 9 is an exemplary view illustrating a configuration of a report output material.

BEST MODE

The present disclosure may be embodied in various other forms without departing from the technical spirit or main characteristics thereof. Accordingly, exemplary embodiments of the present disclosure are merely illustrative in all respects and should not be construed as limiting.

The terms such as "first", "second", and the like are only used for the purpose of distinguishing one component from another component. For example, the first component may be referred to as a second component without departing from the scope of the present disclosure, and similarly, the second component may be referred to as a first component.

When a component is referred to as being "coupled" or "connected" to another component, it can be directly coupled or connected to the other component or intervening components may be present.

The singular forms used in the present application are intended to include the plural forms as well, unless the context clearly indicates otherwise. In the present application, terms such as "comprise" or "is provided with", "have" and the like are intended to represent the components or combinations thereof presence of the described in the specification, and the possibility that other components or features may be present or added is not precluded.

Hereinafter, an exemplary embodiment of the present disclosure will be described in detail with reference to the accompanying drawings.

Figure 1:
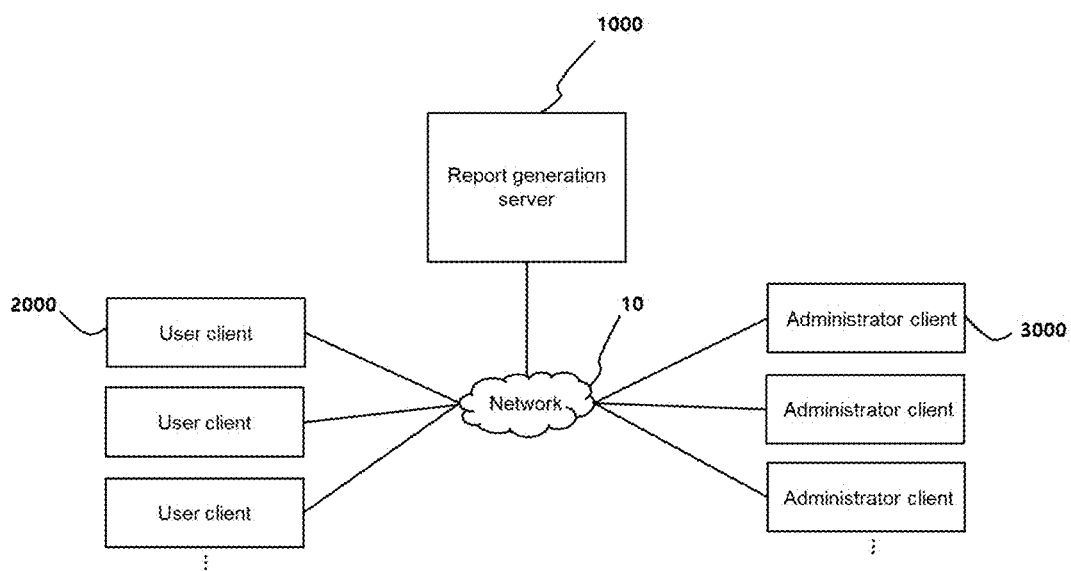
FIG. 1 is a configuration diagram illustrating an overall system in which a method for generating an online report according to an exemplary embodiment of the present disclosure is executed.
Figure 2:
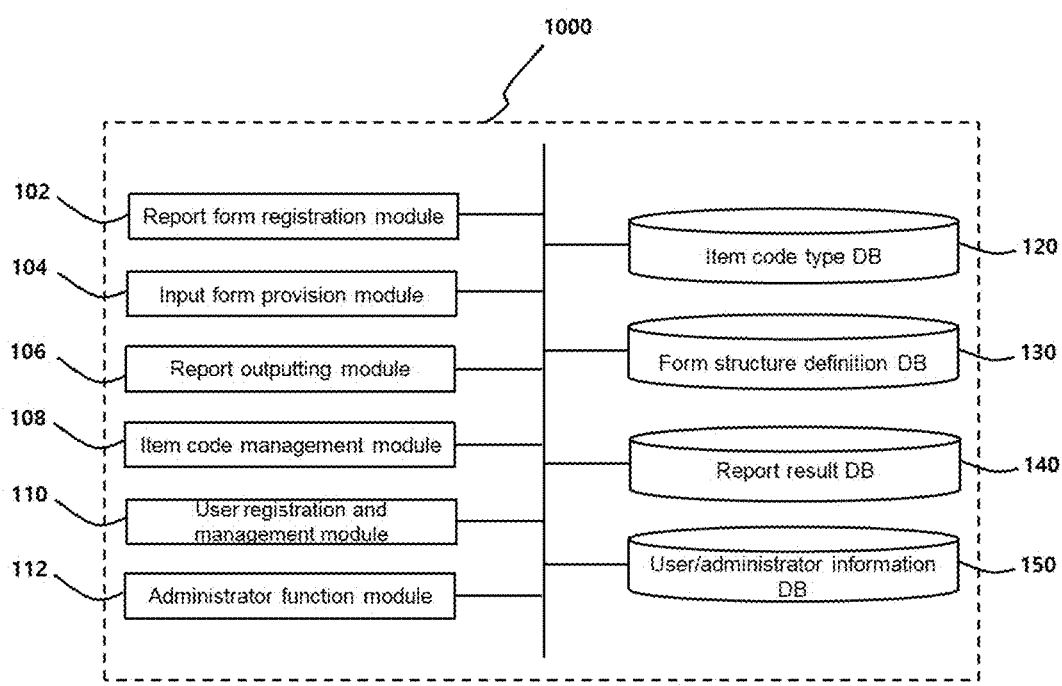
FIG. 2 is a configuration diagram illustrating a report generation server according to the exemplary embodiment of the present disclosure.
Figure 3:
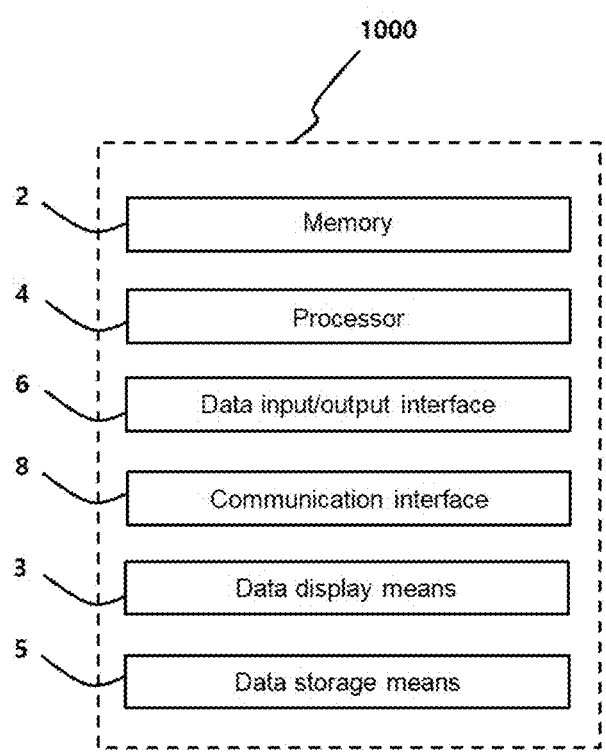
FIG. 3 is a schematic diagram, from a hardware perspective, illustrating the report generation server according to the exemplary embodiment of the present disclosure.

FIG. 1 is a configuration diagram illustrating an overall system in which a method for generating an online report according to the exemplary embodiment of the present disclosure is executed. FIG. 2 is a configuration diagram illustrating a report generation server according to the exemplary embodiment of the present disclosure. FIG. 3 is a schematic diagram, from a hardware perspective, illustrating the report generation server according to the exemplary embodiment of the present disclosure.

The method for generating the online report according to the exemplary embodiment of the present disclosure is executed in a report generation server 1000 interworking with a user client 2000 and an administrator client 3000 through a network 10. For example, the network 10 is a general communication network including a wired network and/or a wireless network, and may be an IP network.

The report generation server 1000 is configured to register input form setting information of a report in a form structure definition DB 130 through an administrator client 3000, store input information for each item, which is input through an input form from the user client 2000, in a report result DB 140, and for the report requested to be output, generate and output the report having a form in which the input information for each item stored in the report result DB 140 is combined with a preset output form.

As an example, the report generation server 1000 may be a server of an institution requiring management of various facilities or tasks, such as a company, a public institution, a research institution, and a university.

As an example, each of the user client 2000 and the administrator client 3000 may be understood as a device such as a PC, a smartphone, a tablet, and the like, which are provided with a communication module and web browsing software to be able to access a website of the report generation server 1000, and may perform a display function and input function for text and images.

As another example, each of the user client 2000 and the administrator client 3000 is provided with a communication module and a report use/management application program, and may be configured to be able to access the report generation server 1000 by using the application (APP).

As shown in FIG. 2, from a functional point of view, the report generation server 1000 according to the present exemplary embodiment includes: a report form registration module 102 configured to receive an input of a report form name and item setting information for generating a new report form from the administrator client 3000, and register input form setting information of the report including the report form name and the item setting information in a form structure definition DB 130; an input form provision module 104 configured to receive an input of the selected report form name of the report desired to be newly written from the user client 2000 on the basis of the form structure definition DB 130, provide an input form to the user client 2000 on the basis of the registered input form setting information for the selected and input report form name, and store and manage input information for each item input through the input form in a report result DB 140 together with the corresponding a report outputting module 106 report form name; configured to generate and output the report having a form in which the report form name and the input information for each item, which are stored in the report result DB 140, are combined with a preset output form for the report requested to be output by the user client 2000; and an item code management module 108 configured to set, register, and manage various items codes belonging to an input item group, a selection item group, an attachment item group, and the like in an item code type DB 120.

In addition, the report generation server 1000 according to the present exemplary embodiment includes: a user registration and management module 110 for registering and managing report users; and an administrator function module 112 for registering and managing report administrators and providing various administrator functions, and although not shown, includes an operation module for managing the entire server operation, and enabling provision of a communication function, a login function, and the like, which are performed with the user client 2000 and the administrator client 3000 through a network 10.

In addition, the report generation server 1000 includes: an item code type DB 120 for setting, registering, and managing item codes such as the input item group, the selection item group, and the attachment item group; a form structure definition DB 130 for registering and storing input form setting information of a report; a report result DB 140 for storing and managing input information for each item, which is input through an input form, together with the corresponding report form name; and a user/administrator information DB 150 for registering and storing report users and/or report administrators, and although not shown, includes a log DB (not shown) for storing and managing log records of each of the users and administrators.

Referring to FIG. 3, from the hardware perspective, the report generation server 1000 according to the present exemplary embodiment includes: a memory 2 for storing one or more instructions; and a processor 4 for executing one or more instructions stored in the memory 2, and refers to as a computing device for executing a computer program, stored in a medium, to execute the method for generating the online report. The report generating server 1000 of the present exemplary embodiment may further include a data input/output interface 6, a communication interface 8, a data display means 3, and a data storage means 5.

Figure 4:
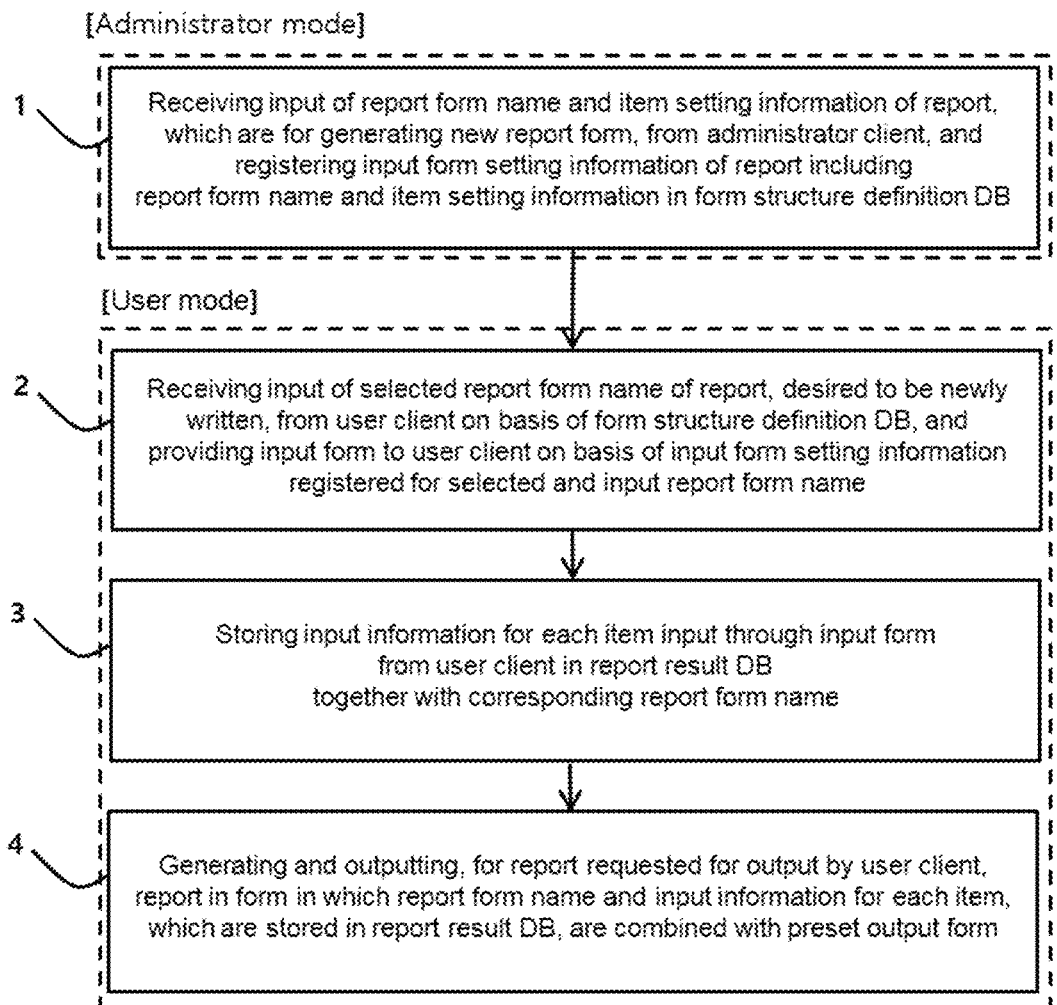
FIG. 4 is a flowchart illustrating a method for generating an online report according to the exemplary embodiment of the present disclosure.

FIG. 4 is a flowchart illustrating a method for generating an online report according to the exemplary embodiment of the present disclosure.

First, an administrator mode will be described. The administrator mode is a mode in which an administrator registered in the administrator information DB 160 of the report generation server 1000 accesses the report generation server 1000 through administrator login so as to execute input and/or output, and a client accessing in the administrator mode is regarded as the administrator client 3000. The report generation server 1000 interworks with the administrator client 3000 to execute a function related to report form registration management and user registration management.

In step 1), the report generation server 1000 receives an input of a report form name and item setting information of a report, desired to be newly generated, from an administrator client 3000, and registers input form setting information of the report including the report form name and the item setting information in a form structure definition DB 130. When input form setting information is registered, a recipient to receive a corresponding report output material may be designated as well.

The item setting information is input on the basis of item codes previously registered in an item code type DB 120.

FIG. 5 is an exemplary view illustrating a configuration of the item code type DB. An item code is assigned as an identification code for each item distinguished by data content and/or structure thereof.

The input of the item setting information may be performed as follows.

The report generation server 1000 receives a selection of one or more item codes for constituting the input form setting information from among a plurality of item codes previously registered in the item code type DB 120, and receives an input of item names for the selected item codes. The selection of the item code and the input of the item name are performed by the administrator client 3000, and to this end, the report generation server 1000 provides a menu for the selection of the item codes and the input of the item names to the administrator client 3000.

In addition, data format conditions capable of being input to the input form are defined for the selected item codes by the administrator client 3000 on the basis of data formats fundamentally set in the item code type DB 120.

As an example, the data format may be set in a form of text data, numeric data, image file, and the like and the data format condition may be defined by the number of texts of text data that may be input, the number of numeric digits of numeric data that may be input, a format of image files that may be input, the number of files that may be input, etc.

Each of the item codes may be configured as follows.

As an example, each of the item codes is configured to include an item code of an "input item group" configured to allow a user to directly input text data or numeric data through an input box.

Referring to FIG. 5, the item code for inputting text data is an item code "A", and the item code for inputting numeric data is an item code "J". These item codes are item codes of a method in which text or numbers are directly input, and may be classified into the "input item group". An item code "K" and the like for inputting contact information may also be classified into the "input item group".

As another example, each of the item codes is configured to include an item code of a "selection item group" configured to allow the user to select and input one or more options from among a plurality of options set by an administrator.

Referring to FIG. 5, the item codes configured to allow the user to select and input any one or more options from among the plurality of options are item codes of "B (a selection box)", "C (a check box)", "I (a radio box)", etc. These item codes are item codes of a method in which the user selects and inputs an option, and may be classified into the "selection item group".

As yet another example, each of the item codes is configured to include an item code of an "attachment item group" configured to allow the user to attach and input an image file stored in the user client 2000.

Referring to FIG. 5, the item codes configured to allow the user to attach and input an image file are item codes of "CD (image selection)", "D (image)", "H (map)", etc. These item codes are item codes of a method in which the user attaches and inputs the image file stored in the user client 2000, or photographs and inputs an image by using a camera of the user client 2000, or attaches and inputs a map image obtained by using a web/app service, and may be classified into the "attachment item group".

In addition to the above item codes, item codes of various functions, such as an item code "M" for obtaining code information by recognizing the image of a barcode/QR code, and the like may be included.

FIG. 6 is an exemplary view illustrating a configuration of the form structure definition DB, and illustrates a state in which input form setting information of a report including a report form name and item setting information is input through the administrator client 3000 and registered in the form structure definition DB 130.

The exemplified input form is registered with an input form code assigned as "183", and an input form name (i.e., a report form name) is a "Facility Maintenance Report".

As an example, the form structure definition DB 130 includes "input form fundamental information" and "item setting information", and "option setting information" defining a plurality of options selectable from the corresponding item is further included when an input form includes an item belonging to the "selection item group".

Each item constituting the input form code "183" is assigned an item-specific serial number from 1 to 9, and a display order (i.e., an output order of input items) at a time when the input form is displayed on a screen of the user client 2000 is defined. In addition, a data format condition (e.g., a data length, a minimum value, a maximum value, etc.) for each item constituting the input form code "183" are also defined.

Next, a user mode will be described. The user mode is a mode in which a user registered in the user information DB 150 of the report generating server 1000 accesses the report generating server 1000 through user login so as to execute input and/or output, and a client accessing in the user mode is regarded as the user client 2000. The report generation server 1000 interworks with the user client 2000 to provide a function of selecting an input form of any one report form registered by the administrator client 3000 and writing a report by inputting report content and a function of using a report output material. The report output material may be used through the administrator client 3000.

In step 2), the report generation server 1000 receives an input of a selected report form name of a report, desired to be newly written, by the user client 2000 on the basis of the form structure definition DB 130, and allows the input form to be provided to the user client 2000 on the basis of the input form setting information registered for the selected and input report form name. The selection and input of the report form name may be performed through a selection menu provided by the report generation server 1000.

Preferably, the input form is provided by visually placing an input pattern for each item code (i.e., an input window or input template for each item code) predefined for each item code on an application input screen or a web input screen of the user client 2000 on the basis of the input form setting information. The input pattern for each item code may be understood as an input structure unit of the input form for inputting data on the basis of a data format fundamentally set in the item code type DB 120 for each item code, and may also be understood as a template predefined for data input. Such a template may be individually implemented for each item code in a file format of a typical web screen configuration or an app screen configuration, and may be individually inserted into the input form for each item so as to be displayed on a screen.

Through such a configuration, in the method for generating the online report of the present exemplary embodiment, the data input window or input menu for writing a report of various forms is not required to be individually coded and developed for each input report form, and an input form including an input pattern for each item code for each item may be provided just by registering the report's input form setting information, including the report form name and item setting information, in the form structure definition DB 130.

Figure 8A:
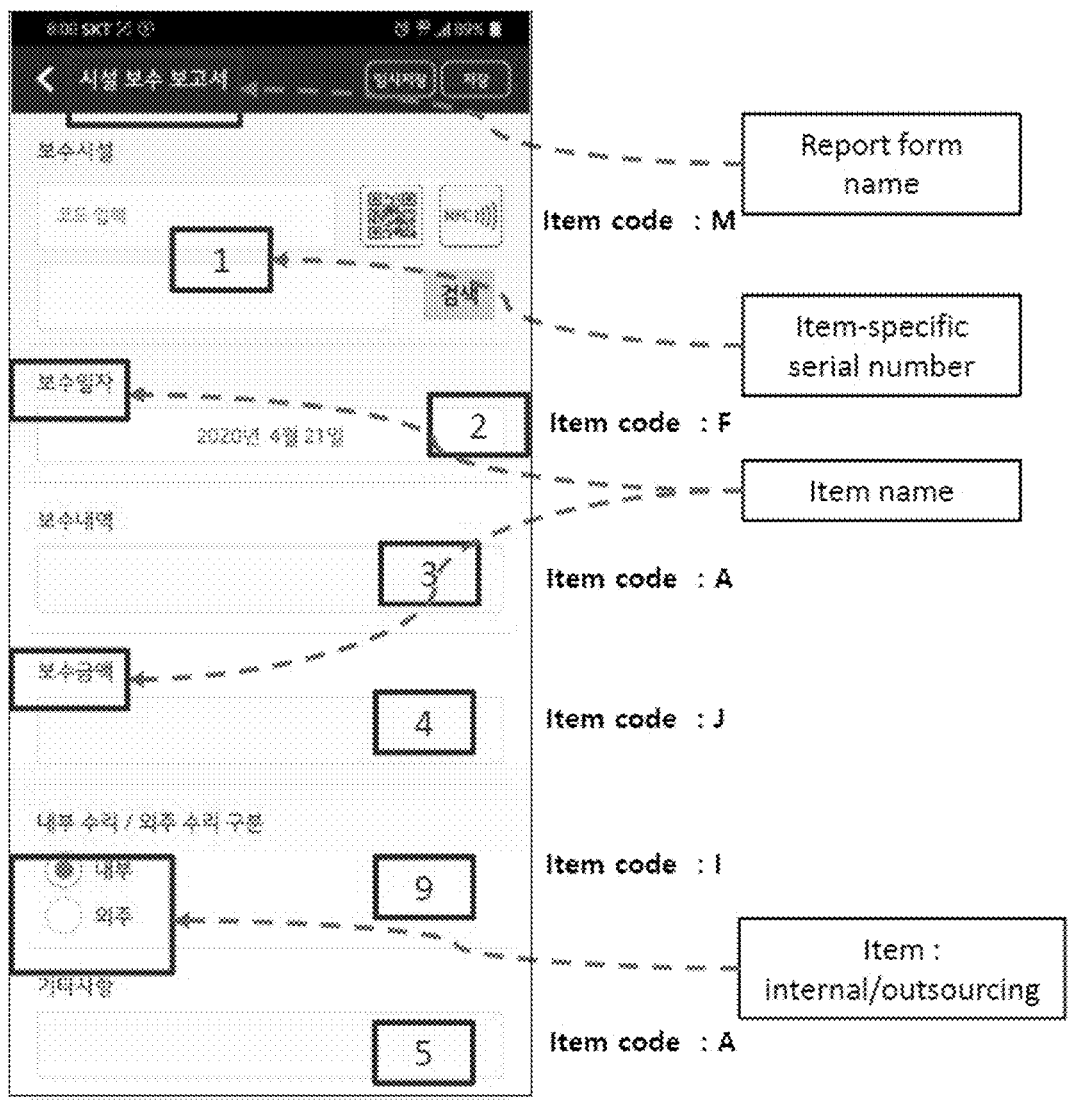
FIGS. 8a and 8b are exemplary views respectively illustrating configurations of input forms.
Figure 8B:
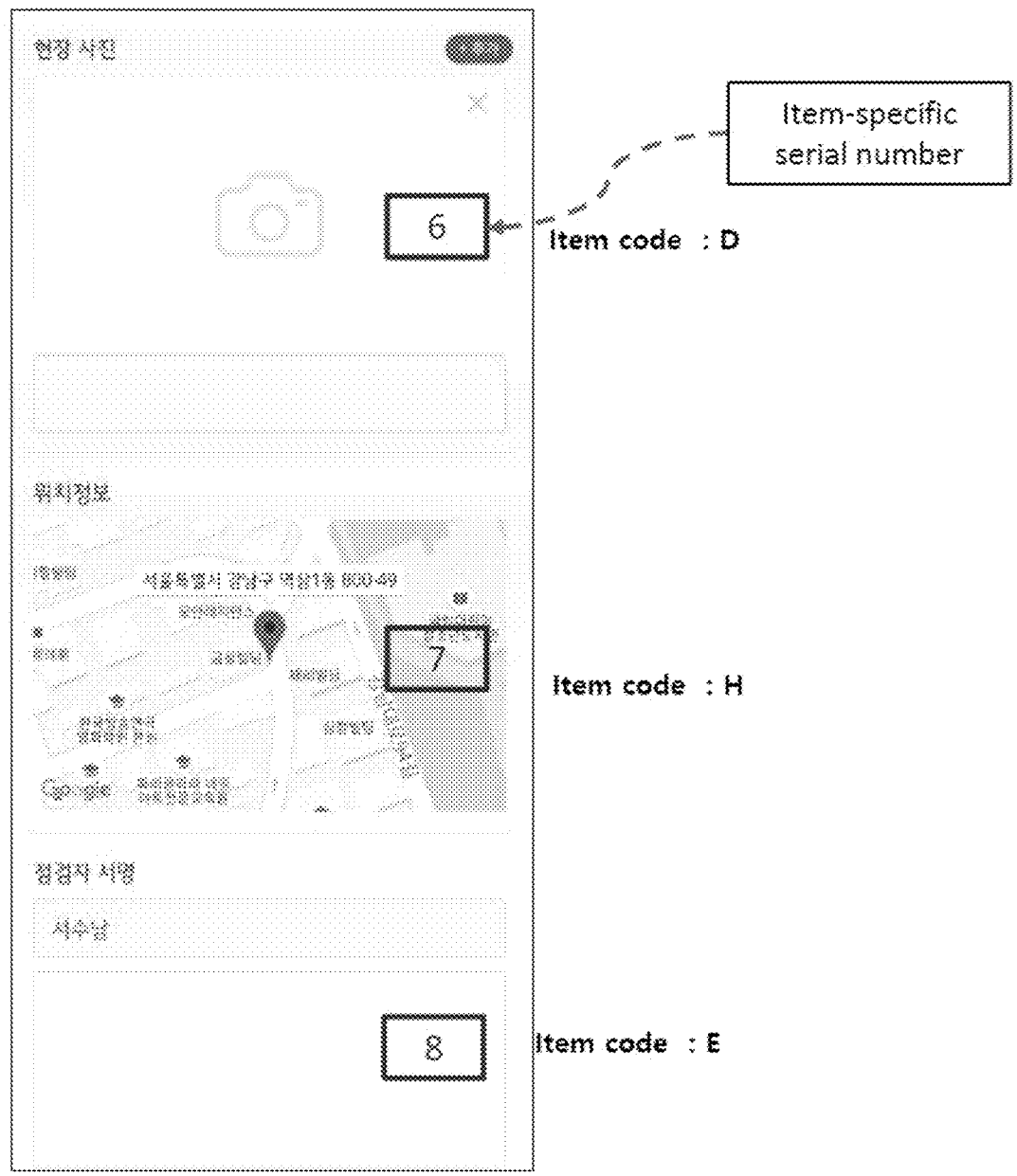

FIGS. 8a and 8b are exemplary views respectively illustrating configurations input forms, and of illustrating a state in which an input form is displayed on a screen of the user client 2000 on the basis of the form structure definition DB of the input form code "183" illustrated in FIG. 6. The screen of the user client 2000 exemplifies an app screen of a mobile terminal, but may be configured in a form of a web screen on a PC or on the mobile terminal.

An input form name (i.e., a report form name) "Facility Maintenance Report" is displayed at an upper end of the screen of the input form, and is displayed in a state in which an input pattern for each item code predefined for each item code is combined to form one input form according to a display order (i.e., an output order of input items) defined in the form structure definition DB 130.

As an example, items of item-specific serial numbers "2", "3", "4", and "5" are items of a method for inputting text or a number, and are configured to display a text/number input box as the input pattern for each item code.

In a case of a "division of internal maintenance/outsourcing maintenance" item with an item-specific serial number "9", "inside" or "outside" as a plurality of selectable options is displayed in a form of a radio box.

Items with item-specific serial numbers "6" and "7" are items of an image attachment method, and are configured to display an input box for attaching an image as an input pattern for each item code.

An item with an item-specific serial number "8" is an item for inputting an inspector's signature, and when a user inputs the signature thereof through a touch pen, the signature is converted into an image file and is input in the image attachment method.

In step 3), the report generating server 1000 stores the input information for each item input from the user client 2000 through the input form in the report result DB 140 together with the report form name of the corresponding report. The input information for each item is input on the basis of the item setting information.

FIGS. 7a and 7b are exemplary views respectively illustrating a configuration of a report result DB, and illustrate a state in which a report form name and input information for each item, which are input through an input form, are registered in the report result DB 140.

An exemplified report result is stored with a report result code assigned as "473", and is one of reports written by using a report form of the input form code "183".

As an example, the report result DB 140 includes "report result fundamental information", "relations between input information for each item and item setting information", and "result information (i.e., input information for each item)".

The "relations between input information for each item and item setting information" stores each matching relation between items included in the "item setting information" defining an input form and items in the "input information for each item" constituting a report output material. Through such a matching relation, the input information for each item input through the input form is matched with report result information, thereby outputting the information to a report. As an example, the report result DB 140 also stores a mutual matching relation between a report result code and an input form code.

Each item constituting a result code "473" is in a state of being assigned an item-specific serial number from "1" to "9" defined in the input form, and a display order (i.e., an output order (of output forms)) at a time when the result code "473" is displayed as a report output material on the screen of the user client 2000 is defined in the "result information (i.e., input information for each item)". In addition, result data (i.e., data input through the input form) for each item constituting the result code "473" is stored in the "result information (i.e., the input information for each item)".

In step 4), for a report requested to be output by the user client 2000, the report generating server 1000 generates and outputs the report in a form in which the report form name and input information for each item, which are stored in the report result DB 140, are combined with a preset output form.

Preferably, the output form is set by a report output form file defining an output form structure of a report on the basis of the input form setting information.

As an example, the output form file is provided with a form configuration defined according to each report form, and may be registered in the report generating server 1000 when the input form setting information of the report is registered in the form structure definition DB 130 in step 1). A "connection output form code" of FIG. 6 represents a form code of a matched and registered output form file. Various commercial reporting tools (e.g., an OZ report, a Ubi report, a CLIP report, an AI report, etc.) for outputting data, which is stored in a database, as a report output material have been known, and the output form file according to the present exemplary embodiment may be produced, by using such reporting tools, in consideration of a data structure of a report form desired to be newly written, and may be registered in the report generation server 1000.

Figure 9:
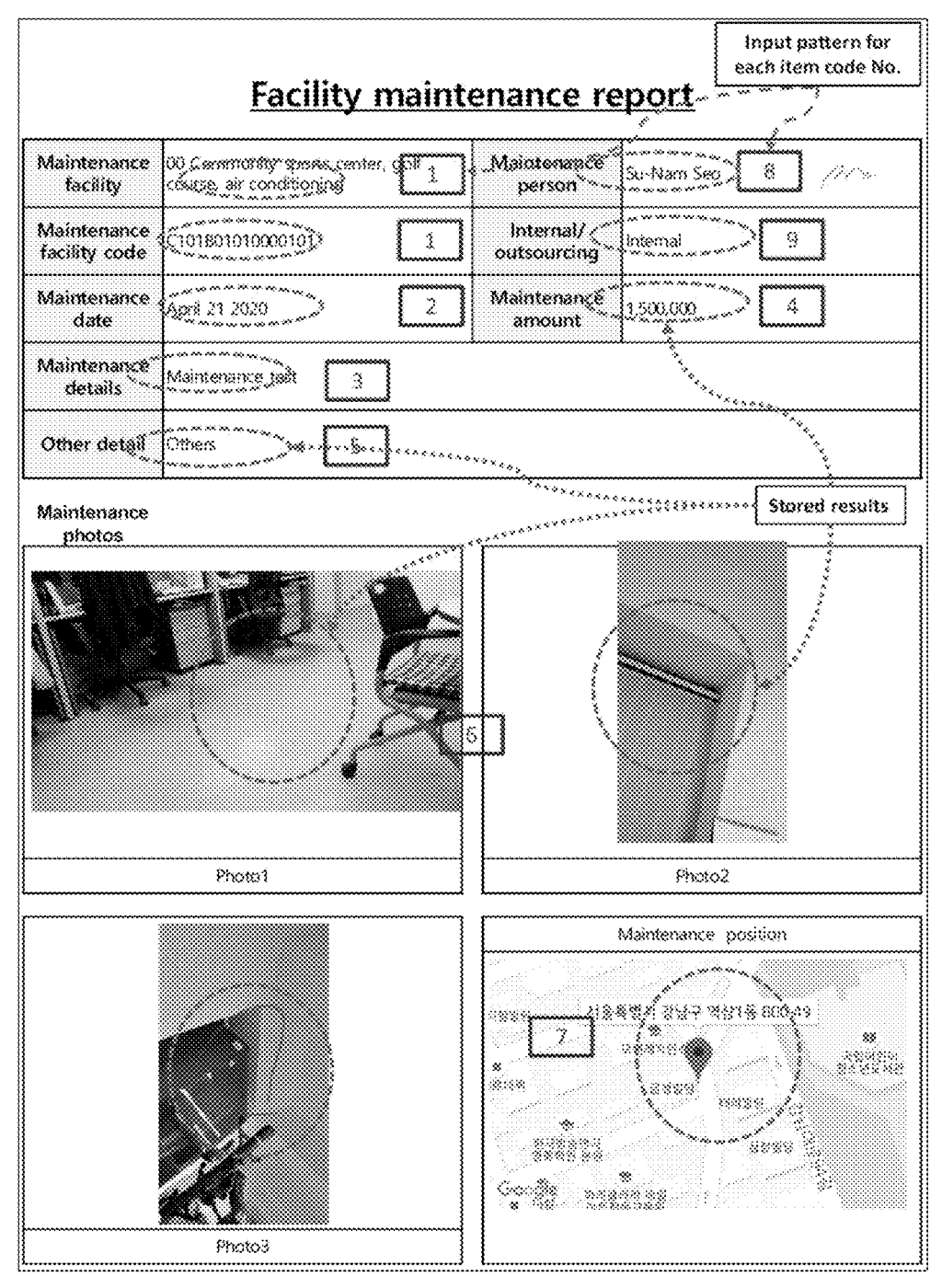

FIG. 9 is an exemplary view illustrating a configuration of the report output material, and illustrates a state in which the report output material is displayed on the screen of the user client 2000 under the result code "473" illustrated in FIGS. 7a and 7b on the basis of the report result DB 140.

A report name "Facility Maintenance Report" is displayed at an upper end of a screen of the report output material, and the result information (i.e., the input information for each item) is output and displayed for each item according to the output order of the report result DB 140 and the output form configuration defined in the report output form file.

An item with an item-specific serial number "6" is an item of the image attachment method, and since a plurality of images is attached even though the item code is one, the plurality of images is displayed in the report output material.

Meanwhile, preferably, the method for generating the online report according to the present exemplary embodiment is configured such that in the form structure definition DB 130, an item-specific serial number is assigned to each item constituting the input form setting information, and a display order of each item in an input form that is displayed and provided on the screen of the user client 2000 is defined on the basis of the item-specific serial number.

In addition, the report result DB 140 is configured such that an item-specific serial number is assigned to the input information for each item, and a display order of the input information for each item in the output form displayed and provided on the screen of the user client 2000 is defined on the basis of the item-specific serial number.

As an example, when an item belonging to the "selection item group" is included the input form, it may be configured for just one option to be selected for one item, but it may also be configured for two or more options to be selected for the one item. In addition, when two or more pieces of result data for one item are configured to be selected, two or more pieces of the result data for the one item should be stored in the report result DB 140, as a result.

As another example, when an item belonging to the "attachment item group" are included in an input form, two or more pieces of result data (i.e., attached images) may be attached for one item, and as a result, two or more pieces of the result data (i.e., the attached images) for one item should be stored in the report result DB 140.

In a case where a serial number and an input order/output order are not managed separately for one item, there may occur inconvenience in which each result data should be managed by giving a separate serial number and/or an output order, in spite of being the result data for the one item.

However, when the item-specific serial number is managed in the database by way of separating the item-specific serial number from the input order in the input form or the output order in the output form as in the present exemplary embodiment, these values are not required to be separated and managed as a separate item (i.e., a separate serial number and/or output order) even when two or more input values or output values are managed for one item, so there is an advantage that the database may be managed in a relatively simple structure.

Meanwhile, as a modified example, each report of the present exemplary embodiment may be managed by being divided into report form groups according to a characteristic of a report target.

In this case, preferably, in step 1), input form setting information of a report may be classified to belong to any one of report form groups (e.g., a facility management A group) among a plurality of report form groups (e.g., the facility management A group, a facility management B group, etc.), so as to be registered in the form structure definition DB 130.

Through such a configuration, the report generating server 1000 of the present exemplary embodiment may manage report writing permission for each user by classification as described below.

First, in the administrator mode, in step 1-1), the report generation server 1000 receives personal identification information and report writing permission information of a user who desires to be registered as a new user from the administrator client 3000, and registers the information in the user information DB.

The report writing permission information is information about which report form group the user has a writing permission for among a plurality of report form groups registered in advance.

In step 2), the report generation server 1000, presents a form name (e.g., Facility Maintenance Report) of one or more reports belonging to a report form group (e.g., the facility management A group) for which the user has the writing permission on the basis of the user's personal identification information and report writing permission information, which are registered in the user information DB, to the user client 2000, and receives an input of the selected report form name of the report, desired to be newly written, from the user client 2000 on the basis of one or more presented report form names. The user client 2000 may input content to be reported in the input form of the selected report.

When such a configuration is taken, the convenience of report management by the administrator and the convenience of using the report by the user may be obtained.

The exemplary embodiments of the present various disclosure include a program for performing operations implemented by a computer and a computer-readable recording medium recording the same. The computer-readable recording medium may include program instructions, data files, data structures, and the like alone or in combination thereof. The medium may be specially designed and configured for the present disclosure, or may be known and available to those skilled in the art of computer software. Examples of the computer-readable recording media include: magnetic media such as hard disks, floppy disks, and magnetic tapes; optical media such as CD-ROMs, DVDs, and USB drives; magneto-optical media such as floptical disks; and a hardware device specially configured to store and execute program instructions, the hardware device including such as ROM, RAM, flash memory, etc. Examples of the computer instructions include not only: machine language code generated by a compiler, but also high-level language code executable by a computer using an interpreter or the like.

The invention claimed is:

1. A method for generating an online report using a form structure definition database (DB), the method being executed on a report generation server configured to interwork with a user client and an administrator client through a network and comprising:
   1) receiving, in an administrator mode, an input of a report form name and item setting information, which are for generating a new report form, from the administrator client, and registering input form setting information of a report including the report form name and the item setting information in the form structure definition DB, wherein the item setting information is input on the basis of a plurality of item codes previously registered in an item code type DB, each of the plurality of item codes being assigned as an identification code to a corresponding one of a plurality of items;
   2) receiving, in a user mode, an input of a selected report form name of the report, desired to be newly written, from the user client on the basis of the form structure definition DB, and providing an input form to the user client on the basis of the input form setting information registered for the selected report form name;
   3) storing, in the user mode, input information for each item input through the input form from the user client in a report result DB together with a corresponding report form name and matching relation between each item included in the item setting information and each item in the input information, wherein the input information for each item is input on the basis of the item setting information; and
   4) generating and outputting, in the user mode for a report requested for output by the user client, the report in a form in which the report form name and the input information for each item, which are stored in the report result DB, are combined with a preset output form,
   wherein, in the form structure definition DB, an item-specific serial number is assigned to each item constituting the input form setting information and a display order of each item in the input form displayed and provided on a screen of the user client is defined on the basis of the item-specific serial number, and in the report result DB, the item-specific serial number is assigned to the input information for each item and the display order of the input information for each item in the output form displayed and provided on the screen of the user client is defined on the basis of the item-specific serial number.

2. The method for claim 1, wherein the inputting of the item setting information is performed in a way of receiving one or more selected item codes to constitute the input form setting information among a plurality of item codes previously registered in the item code type DB, receiving respective item names for the selected item codes, and defining data format conditions capable of being input to the input form on the basis of data formats fundamentally set in the item code type DB for the selected item codes.

3. The method for claim 2, wherein the item codes are configured to comprise item codes of an input item group configured to allow a user to directly input text data or numeric data through an input box.

4. The method for claim 2, wherein the item codes are configured to comprise item codes of a selection item group configured to allow a user to select and input any one or more options from among the plurality of options that is set by an administrator.

5. The method for claim 2, wherein the item codes are configured to comprise item codes of an attachment item group configured to allow a user to attach and input an image file stored in the user client.

6. The method for claim 2, wherein the input form is provided by visually placing an input pattern for each item code predefined for each item code on a web input screen or an application input screen of the user client on the basis of the input form setting information.

7. The method for claim 1, wherein the output form is set by a report output form file defining an output form structure of the report on the basis of the input form setting information.

8. The method for claim 1, wherein, in step 1), the input form setting information of the report is classified to belong to any one of report form groups among a plurality of report form groups, so as to be registered in the form structure definition DB.

9. The method for claim 8, further comprising:
   1-1) receiving, in the administrator mode, an input of personal identification information and report writing permission information of a user who desires to be registered as a new user from the administrator client and registering the input information in a user information DB, wherein the report writing permission information is information about which report form group the user has a writing permission for among the plurality of pre-registered report form groups, and,
   in step 2), one or more report form names belonging to the report form group to which the user has the writing permission is presented to the user client on the basis of information of the user's personal identification information and the report writing permission information, the information being registered in the user information DB, and the report form name of the report to be newly written is selected and input from the user client on the basis of one or more presented report form names.

10. A computer program stored in a non-transitory computer readable medium, the computer program being stored in the medium so as to execute a method for generating an online report, and the method comprising:
1) receiving, in an administrator mode, an input of a report form name and item setting information, which are for generating a new report form, from the administrator client, and registering input form setting information of a report including the report form name and the item setting information in a form structure definition database (DB), wherein the item setting information is input on the basis of a plurality of item codes previously registered in an item code type DB, each of the plurality of item codes being assigned as an identification code to a corresponding one of a plurality of items;
2) receiving, in a user mode, an input of a selected report form name of the report, desired to be newly written, from the user client on the basis of the form structure definition DB, and providing an input form to the user client on the basis of the input form setting information registered for the selected report form name;
3) storing, in the user mode, input information for each item input through the input form from the user client in a report result DB together with a corresponding report form name and matching relation between each item included in the item setting information and each item in the input information, wherein the input information for each item is input on the basis of the item setting information; and
4) generating and outputting, in the user mode for a report requested for output by the user client, the report in a form in which the report form name and the input information for each item, which are stored in the report result DB, are combined with a preset output form,
wherein, in the form structure definition DB, an item-specific serial number is assigned to each item constituting the input form setting information and a display order of each item in the input form displayed and provided on a screen of the user client is defined on the basis of the item-specific serial number, and in the report result DB, the item-specific serial number is assigned to the input information for each item and the display order of the input information for each item in the output form displayed and provided on the screen of the user client is defined on the basis of the item-specific serial number.

* * * * *